United States Patent
Uyttendaele et al.

(10) Patent No.: US 12,502,844 B2
(45) Date of Patent: Dec. 23, 2025

(54) METHOD FOR CONNECTING A FILM TO A SUBSTRATE

(71) Applicant: Robert Bosch GmbH, Stuttgart (DE)

(72) Inventors: Andreas Markus Uyttendaele, Stuttgart (DE); Lukas Alter, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 334 days.

(21) Appl. No.: 18/296,483

(22) Filed: Apr. 6, 2023

(65) Prior Publication Data
US 2023/0321925 A1    Oct. 12, 2023

(30) Foreign Application Priority Data
Apr. 7, 2022 (DE) .................. 10 2022 203 529.1

(51) Int. Cl.
*B29C 65/78* (2006.01)
*B23K 26/21* (2014.01)
*B29C 65/16* (2006.01)

(52) U.S. Cl.
CPC .......... *B29C 65/7841* (2013.01); *B23K 26/21* (2015.10); *B29C 65/16* (2013.01)

(58) Field of Classification Search
CPC . B29C 65/7841; B29C 65/16; B29C 66/1122; B29C 66/472; B29C 65/1635; B29C 66/45; B29C 66/52272; B23K 26/21; B23K 1/0056; B23K 26/037; B23K 26/22; B23K 31/003; B29L 2031/3425; B25B 11/00
See application file for complete search history.

(56) References Cited

FOREIGN PATENT DOCUMENTS

| DE | 102008063975 A1 | 7/2010 |
| DE | 102018200544 A1 | 7/2019 |
| DE | 102019215000 A1 | 4/2021 |
| DE | 102020130932 A1 | 5/2022 |

OTHER PUBLICATIONS

Machine English translation of DE102018200544, Accessed May 14, 2025 (Year: 2019).*
Machine English translation of DE102019215000, Accessed May 14, 2025 (Year: 2021).*

* cited by examiner

*Primary Examiner* — Abbas Rashid
*Assistant Examiner* — Adrianna N Konves
(74) *Attorney, Agent, or Firm* — Michael Best & Friedrich LLP

(57) ABSTRACT

A method for connecting a film (102) to a substrate (101) includes providing (402) a film (102) and a substrate (101), bringing (403) the film (102) and the substrate (101) together, applying (404) at least one clamping force in at least one clamping region (201), in which the clamping force acts to establish a contact of the film (102) with the substrate (101), and heating (405) the film (102) and/or substrate (101) in at least a respective connecting region (103) in which the film (102) and the substrate (101) are connected together. The clamping force is maintained during the heating process, yet the film (102) and the substrate (101) can be moved relative to one another in the clamping region (201).

9 Claims, 2 Drawing Sheets

METHOD FOR CONNECTING A FILM TO A SUBSTRATE

BACKGROUND

The invention proceeds from a method and an apparatus for connecting a film to a substrate.

Methods for connecting a film to a substrate are known in the prior art.

For example, DE 10 2019 215 000 A1 discloses a method for welding a flexible film to a substrate component, comprising the following steps:
1) pressing the film on the substrate component through a volumetric flow of a fluid,
2) laser welding the film on the substrate component.

SUMMARY

A method having the features of the disclosure offers the advantage that a reliable connection between a film and a substrate can be formed. In particular, a bulging of the film due to thermal stresses during the connecting process can be prevented.

For this purpose, a film and a substrate are provided in one step. In a further step, the film and the substrate are brought together. In a further step, at least one clamping force is applied in at least one clamping region, wherein the clamping force acts within the clamping region for establishing a contact of the film with the substrate. In a further step, the film and/or the substrate is heated in a respective connecting region, wherein the film and the substrate are connected within the connecting region. The clamping force is maintained during the heating process. According to the invention, in the step of heating, the film and the substrate can be moved relative to one another.

In one embodiment of the method according to the invention, stresses that arise during the step of heating due to thermal expansion of the film and/or the substrate can advantageously degrade along the contact surface between the film and the substrate. This prevents the film and the substrate from lifting apart from one another during the heating step, in particular in the connecting region. This ensures that a permanent contact between the film and the substrate exists during the step of heating and a reliable connection is produced.

It is expedient for the film to be mounted loosely at least in the step of heating outside the clamping region, in particular in a direction facing away from the connecting region. In other words, at least in the step of heating, a piece of the film lies freely on the substrate outside the clamping region. This in particular results in the advantage that no mechanical stresses are introduced into the film, for example by fixed mounting of the film outside the clamping region. This can further reduce the risk of a bulging of the film.

Furthermore, it is advantageous for the clamping force to be applied at least in the step of heating by a compressive force of at least one fluid flow directed at the film. This can in particular be a gas stream, for example compressed air or nitrogen. The advantage here is in particular that the clamping force can be applied in a contactless manner. Dirt as well as damage to the film and/or the substrate and a wear of clamping tools can thereby be avoided.

According to a preferred aspect, the clamping force is applied at least in the step of heating substantially perpendicular to the surface of the film and/or the substrate. By a perpendicular effect of the clamping force, mechanical stresses in the film and/or the substrate are avoided. Thus, the risk of a bulging of the film in the step of heating can be further reduced. Furthermore, it is ensured that the film and the substrate are not inadvertently shifted against one another by the clamping force.

It is expedient when, at least in the step of heating, the clamping force is applied by the weight force of at least one mass element in contact with the film. This has the particular advantage that the clamping force can be adjusted comparatively very precisely and also reproducibly between different connection processes over the mass of the mass element. This allows a particularly reproducible connection to be made if the connecting method is used several times.

The at least one mass element can preferably be slidably mounted at least in the step of heating perpendicular to the surface of the film. This has the advantage that the mass element can move freely in the gravitational field in case of a substantially horizontal orientation of the film. In this case, the weight force can preferably act entirely as a clamping force.

According to a preferred aspect, at least in the step of heating, the at least one mass element is mounted slidably along at least one direction parallel to the surface of the film. This direction corresponds to the mean thermal expansion direction in the clamping range. This has the particular advantage that the at least one mass element can move in contact with the film in the event of a thermal expansion of the film. Therefore, in comparison to a mass element that is fixedly mounted parallel to the surface of the film, no static friction force between the film and the mass element must be overcome in order to reduce mechanical stresses. A mechanical stress can thus be reduced more easily, and the risk of a bulging of the film can be further reduced.

Preferably, the film and the substrate are each configured as a metal, in particular as copper. Alternatively, the film and the substrate can each be coated with metal or formed as a polymer. This has the advantage that the method can be used for insulating, applying, or connecting conductive tracks, in particular for connecting flex foils (FPC, flexible printed circuit) onto metalized carriers, e.g., DBC (multi-layer ceramics) and PCB (printed circuit board).

It is expedient to use at least one laser substrate for introducing energy into the film and/or the substrate in the step of heating. This has the particular advantage that the energy for heating the film and/or the substrate can be introduced very quickly and precisely within the connecting region. Thus, high cycle times and a high reproducibility of the compound can be achieved when using the method.

The connecting operation in the step of heating can in particular be a welding operation. Furthermore, it can be a soldering operation. In this case, it is expedient to provide a solder in addition to the film and the substrate and to affix the solder prior to the step of heating at least in the connecting region between the film and the substrate. The solder can in particular be a coating of the film.

The subject-matter of the present invention is also an apparatus for carrying out the described method, comprising
  a first element configured so as to provide the film and the substrate,
  a second element configured so as to bring the film and the substrate together,
  a third element configured so as to apply the clamping force in the clamping region,
  a fourth element configured so as to heat the film and/or the substrate in the connecting region.

BRIEF DESCRIPTION OF THE DRAWINGS

Exemplary embodiments of the invention are illustrated in the drawings and explained in further detail in the following description.

The following are shown.

DETAILED DESCRIPTION

Figure 1:
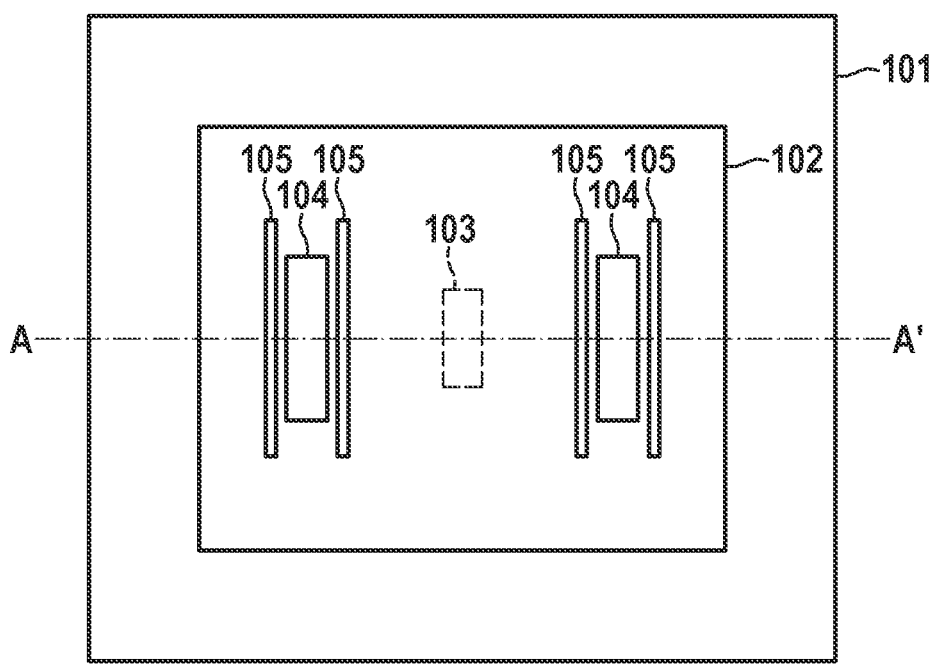
FIG. 1 in an aerial view, an embodiment of the step of heating of the method according to the invention, FIG. 2 a sectional view of the embodiment of FIG. 1 along the line AA', FIG. 3 in a sectional view, an embodiment of the step of heating of the method according to the invention, FIG. 4 a flow chart of an embodiment according to the invention.

FIG. 1 shows, in an aerial view, an embodiment of the step of heating.

Here, a film 102 is in contact with a substrate 101, wherein mass elements 104 are arranged above the film 102 in contact with the film 102. Further shown are also guides 105 of the mass elements 104, as well as a connecting region 103 in which the film 102 and the substrate 101 are connected.

Figure 2:
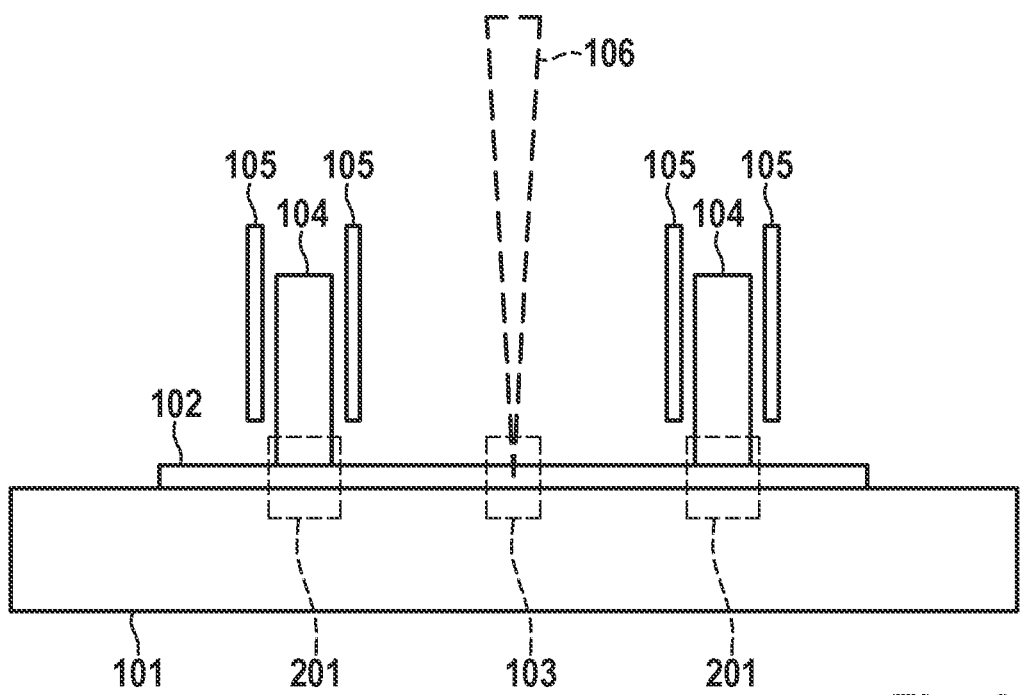

FIG. 2 shows a sectional view of the embodiment of FIG. 1 along a line AA'. Here, the mass elements 104 are slidably mounted perpendicular to the surface of the film 102, so that the weight forces of the mass elements 104 can act entirely as clamping forces substantially perpendicular to the surface of the film 102 within the clamping regions 201.

In this exemplary embodiment, the film 102 is loosely mounted outside the clamping regions 201 on the edges, i.e., the film 102 lies freely on the substrate 101 outside the clamping regions 201. This ensures that no mechanical stresses are introduced by a mounting of the film 102.

In this embodiment, a laser substrate 106 is provided in order to heat the film 102 and the substrate 101, which introduces electromagnetic radiation into the connecting region 103.

The mass of the mass elements 104 is selected such that the film 102 and the substrate 101 can be moved relative to one another in the clamping region 201. Additionally, a gap is formed between the mass elements 104 and the guides 105 such that the mass elements 104 are slidably mounted parallel to the surface of the film 102. As a result, mechanical stresses due to thermal expansion of the film 102 and the substrate 101 can degrade without a bulging of the film 102.

Figure 3:
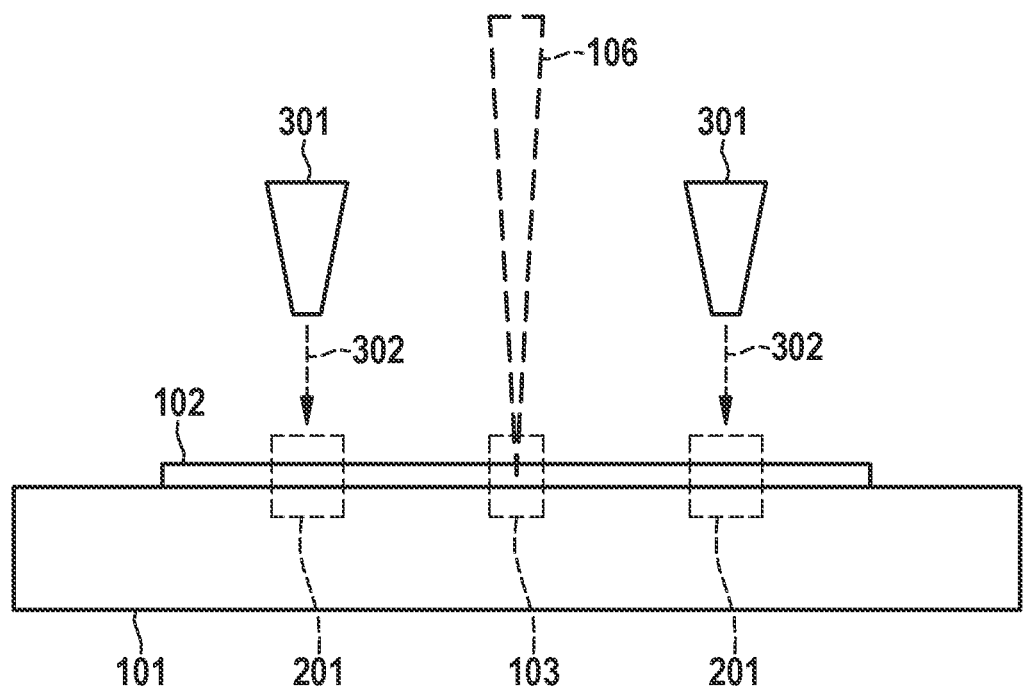

FIG. 3 shows a sectional view of an embodiment of the step of heating of the method according to the invention. Here, a clamping force is applied within the clamping regions 201 by compressive forces from gas flows 302 directed at the film 102, which are aligned by nozzles 301.

Figure 4:
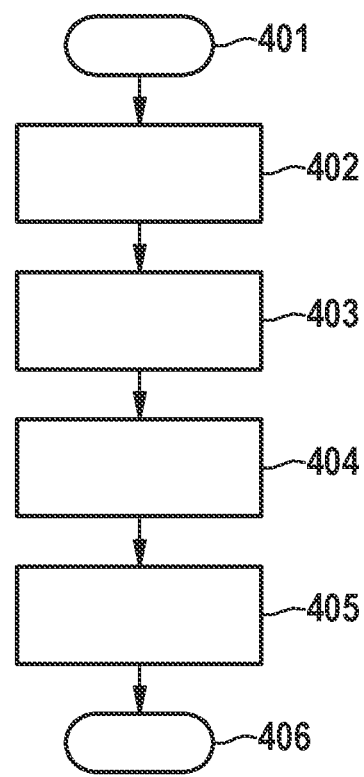

FIG. 4 shows a flow chart of an embodiment according to the invention.

After a starting step 401, a film 102 and a substrate 101 are provided in step 402.

In step 403, the film and the substrate are brought together.

In step 404, at least one clamping force is applied in at least one clamping region 201, wherein the clamping force acts within the clamping region 201 to establish a contact between the film 102 and the substrate 101.

In step 405, the film 102 and/or the substrate 101 is heated in a respective connecting region 103, wherein the film 102 and the substrate 101 are connected within the connecting region 103. The clamping force is maintained during the heating process. The film 102 and the substrate 101 can be moved relative to one another.

In step 406, the method ends in this embodiment.

What is claimed is:

1. A method for connecting a film (102) to a substrate (101), comprising the following steps:
    providing (402) a film (102) and a substrate (101),
    bringing (403) the film (102) and the substrate (101) together,
    applying (404) a clamping force in at least one clamping region (201), in which the clamping force acts to establish a contact of the film (102) with the substrate (101),
    heating (405) the film (102) and/or substrate (101) in at least a respective connecting region (103) in which the film (102) and the substrate (101) are connected together, wherein the clamping force is maintained during the heating,
    wherein in the step of heating, the film (102) and the substrate (101) can be moved relative to one another in the clamping region (201),
    wherein, at least in the step of heating, the clamping force is applied by a weight force of at least one mass element (104) in contact with the film (102),
    wherein, at least in the step of heating, the at least one mass element (104) is slidably mounted perpendicular to a surface of the film (102),
    wherein, at least in the step of heating, the at least one mass element (104) is slidably mounted along a direction parallel to a surface of the film (102), wherein the direction corresponds to a mean thermal expansion direction in the at least one clamping region (201).

2. The method according to claim 1, wherein the film (102), at least in the step of heating, is loosely mounted outside the clamping region (201).

3. The method according to claim 1, wherein, at least in the step of heating, the clamping force is applied by a compression force of at least one fluid stream (302).

4. The method according to claim 1, wherein, at least in the step of heating, the clamping force is applied substantially perpendicular to a surface of the film (102) and/or the substrate (101).

5. The method according to claim 1, wherein the film (102) and the substrate (101) are each coated with metal or formed as a polymer.

6. The method according to claim 1, wherein, in the step of heating, at least one laser substrate (106) is used for introducing energy into the film (102) and/or the substrate (101).

7. The method according to claim 2, wherein the film (102) is loosely mounted outside the clamping region in a direction facing away from the connecting region (103).

8. The method according to claim 3, wherein the at least one fluid stream is a gas stream directed at the film (102).

9. The method according to claim 5, wherein the film (102) and the substrate (101) are each coated with copper.

* * * * *